United States Patent
Lee et al.

(10) Patent No.: US 8,218,475 B2
(45) Date of Patent: Jul. 10, 2012

(54) TRANSMISSION POWER CONTROL METHOD AND SYSTEM

(75) Inventors: Jin-Shyan Lee, Hsinchu (TW); Chun-Chieh Chuang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 615 days.

(21) Appl. No.: 12/411,857

(22) Filed: Mar. 26, 2009

(65) Prior Publication Data
US 2010/0142425 A1 Jun. 10, 2010

(30) Foreign Application Priority Data
Dec. 10, 2008 (TW) ............................... 97148093 A

(51) Int. Cl.
*H04B 7/185* (2006.01)
*H04B 7/00* (2006.01)
*H04W 4/00* (2009.01)

(52) U.S. Cl. ....... 370/318; 370/332; 370/338; 455/13.4; 455/522

(58) Field of Classification Search .......... 370/310–312, 370/318, 332, 338, 349–350; 455/3.3, 13.4, 455/522, 574
See application file for complete search history.

(56) References Cited

U.S. PATENT DOCUMENTS

| 6,680,652 | B2 * | 1/2004 | Hoheisel et al. | 330/302 |
| 6,748,222 | B1 * | 6/2004 | Hashem et al. | 455/453 |
| 6,879,572 | B1 * | 4/2005 | Ayyagari et al. | 370/335 |
| 7,471,738 | B2 * | 12/2008 | Chan et al. | 375/297 |
| 7,538,656 | B2 * | 5/2009 | Twitchell, Jr. | 340/10.1 |
| 2005/0097409 | A1 * | 5/2005 | Shin et al. | 714/704 |
| 2007/0222578 | A1 * | 9/2007 | Iwamura | 340/538 |
| 2009/0059842 | A1 * | 3/2009 | Maltseff et al. | 370/328 |
| 2011/0051609 | A1 * | 3/2011 | Ishii et al. | 370/252 |

FOREIGN PATENT DOCUMENTS

CN 1770902 5/2006

* cited by examiner

*Primary Examiner* — Tri H Phan
(74) *Attorney, Agent, or Firm* — Allen, Dyer, Doppelt, Milbrath & Gilchrist, P.A.

(57) ABSTRACT

A transmitting power level control method and system are provided, whereby the power of a terminal device in a wireless sensor network is saved and the lifetime thereof is extended. The control method includes the steps of: (A) broadcasting a plurality of transmitting power level (TPL) messages, each of which represents a respective TPL and the respective TPLs are different from one another, wherein each of the plurality of TPL messages is broadcasted at the respective TPL thereof; and (B) setting a TPL for the terminal device at a minimum one of the TPLs represented by the TPL messages received by the terminal device.

20 Claims, 6 Drawing Sheets

TRANSMISSION POWER CONTROL METHOD AND SYSTEM

FIELD OF THE INVENTION

The present invention relates to a device and a method for controlling the transmitting power of a terminal device, in particular, to a device and a method for controlling the transmitting power of a terminal device in a wireless sensor network.

BACKGROUND OF THE INVENTION

With the progression of the microelectric mechanic technology and wireless transmission technology, the application of the wireless sensor network becomes much popular.

A wireless sensor network is a network system composed by at least one data collector and lots of sensors, and the communication between the respective components therein is wireless, so that the sensors and the data collectors can be arranged at will, and it is convenient and economical in time to lay out the sensor net system.

A sensor in a wireless sensor network is usually required to be power saving, low cost, and small size, and equipped with a environmental detection device so as to detect the subjects (such as temperature, color, sound, light, smoke and etc.) we are interested in the environment. The detected information is then transmitted to an information collector wirelessly, and then, the environmental status can be known based on the detected information received by the information collector, and relevant applications, such as calamity early warning, can be carried out.

Please refer to FIG. 1, which is a schematic diagram of a wired structural home environment monitoring system according to the prior art. As shown in FIG. 1, a local network includes a control center 11 and a plurality of cluster heads 13, where the cluster heads 13 and the control center 11 are linked by a wired network 12, using the wired protocols such as Power Line Communication (PLC), Ethernet, CAN Bus and etc. Each of the cluster head 13 communicates with a plurality of terminal devices 14 (i.e. end devices), and a star topology is thus shaped, wherein the terminal devices 14 could be a sensor, such as a sensor for temperature, moisture, brightness or smoke, a switch, an alarm, a light controller, an HVAC, a driver of doors and/or windows or an actuator for an emergency accident handle equipment (i.e. sprinkler, generator, exhaust fan and etc.). The wireless communication can be performed with a communication protocol being one selected from a group consisting of a ZigBee, a Z-Wave, a WiBree, a Bluetooth, an Insteon, a WiFi, a UWB and etc.

The terminal devices 14 transmit the detection messages to the cluster head 13 periodically, and then the detection messages are transmitted to the control center 11 via the wired network 12. The control center 11 is configured with corresponding condition and responses control rules. For example, while the smoke detection device transmits a message corresponding to a fire accident characteristic, the control center 11 announces an alarm and actuates an actuator of a sprinkler, etc. Furthermore, the control center 11 could be provided with a function of gateway and allows the user monitoring his home environment and ensuring his house safety via the internet, or sends emergency messages to the user's email or mobile phone.

Please refer to FIG. 2, which is a schematic diagram of a wireless structural home environment monitoring system according to the prior art. As shown in FIG. 2, a mesh network 22 are formed by a control center 21 and a plurality of cluster heads 23 via a wireless network protocol, and similarly each of the cluster head 23 communicates with a plurality of terminal devices 24 and thus a star topology is shaped, as stated in the preceding descriptions.

Based on the above-mentioned examples, an independent power source, generally as a battery, is required for the each of the terminal devices 14, 24 in a wired structural or wireless structural environment monitoring system. Since terminal devices 14, 24 would consume lots of power while detecting the environment status and transmitting the detection message to the cluster heads 13, 23, and the work for maintaining the large number of terminal devices and replacing the batteries thereof are very heavy, complicated, and consuming time, hence it is a important subject in the application of the wireless sensor network that saving the power of the terminal devices 14, 24 and thus prolonging the lifetime of the battery, and reducing the battery change frequency.

From the above description, in order to overcome the drawbacks in the prior art, a transmission power control method and device are provided by the inventor via the diligent research and perseverance working.

SUMMARY OF THE INVENTION

In accordance with one aspect of the present invention is to solve the technical problems in the prior art.

In accordance with another aspect of the present invention is to provide a transmission power control method and system, which can reduce the power consumption of the terminal devices and prolong the use time thereof.

According to an embodiment in the invention, a transmission power control method is provided, the transmission power control method includes the steps as follows: (A) broadcasting a plurality of transmitting power level (TPL) messages, each of which represents a respective TPL and the respective TPLs are different from one another, wherein each of the plurality of TPL messages is broadcasted at the respective TPL thereof; and (B) setting a TPL for the terminal device at a minimum one of the TPLs represented by the TPL messages received by the terminal device.

According to an another embodiment in the invention, a transmission power control method is provided, the transmission power control method includes the steps as follows: (A) determining a successful message transmission ratio (SMTR) of the detecting device; and (B) comparing the SMTR with a threshold value, and adjusting a transmitting power level (TPL) of the detecting device according to a comparing result.

According to an another embodiment in the invention, a transmission power control system is provided, the transmission power control system includes a terminal device and a cluster head, wherein the terminal device is configured for transmitting a detecting message and having a transmitting power level (TPL); the cluster head is configured for receiving the detecting message and broadcasting a plurality of TPL messages, each of the TPL messages represents a respective TPL and is broadcasted at the respective TPL thereof; wherein the respective TPLs are different from one another, and the terminal device receives the plurality of TPL messages and the TPL for the terminal device is set at a minimum one of the TPLs represented by the received TPL messages.

The above objects and advantages of the present invention will become more readily apparently to those ordinarily skilled in the art after reviewing the following detailed descriptions and accompanying drawings, in which:

DETAILED DESCRIPTION OF THE EMBODIMENT

The present invention will now be described more specifically with reference to the following embodiments. It is to be noted that the following descriptions of embodiments of this invention are presented herein for the purposes of illustration and description only; it is not intended to be exhaustive or to be limited to the precise form disclosed.

Figure 1:
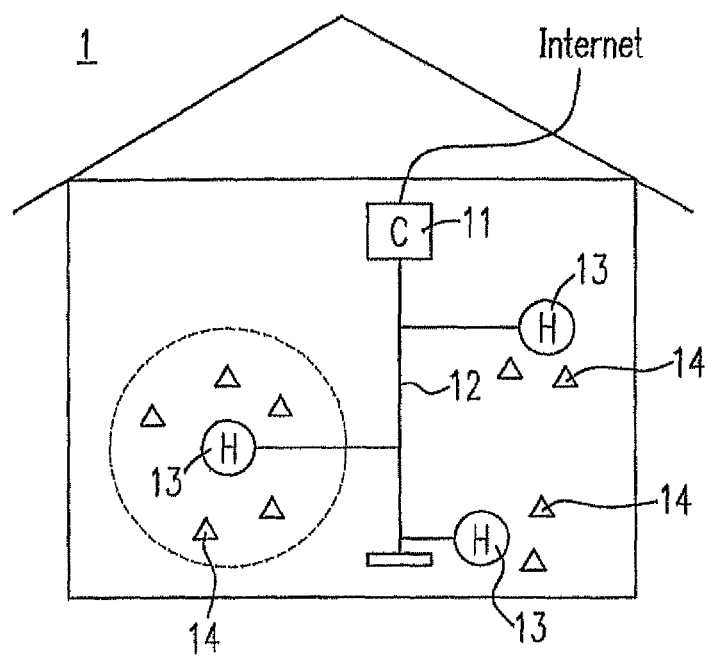
FIG. 1 is a schematic diagram of a wired structural home environment monitoring system according to the prior art.
Figure 2:
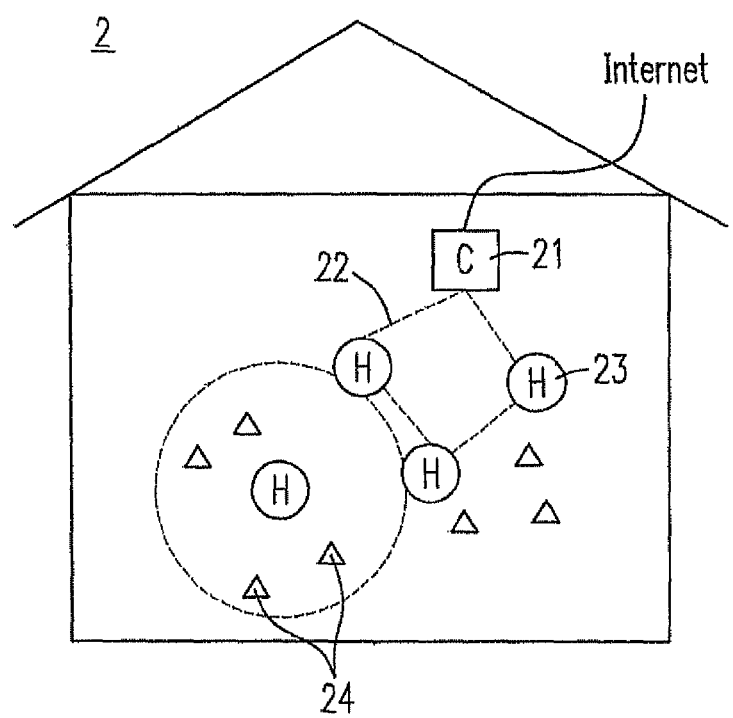
FIG. 2 is a schematic diagram of a wireless structural home environment monitoring system according to the prior art.
Figure 3:
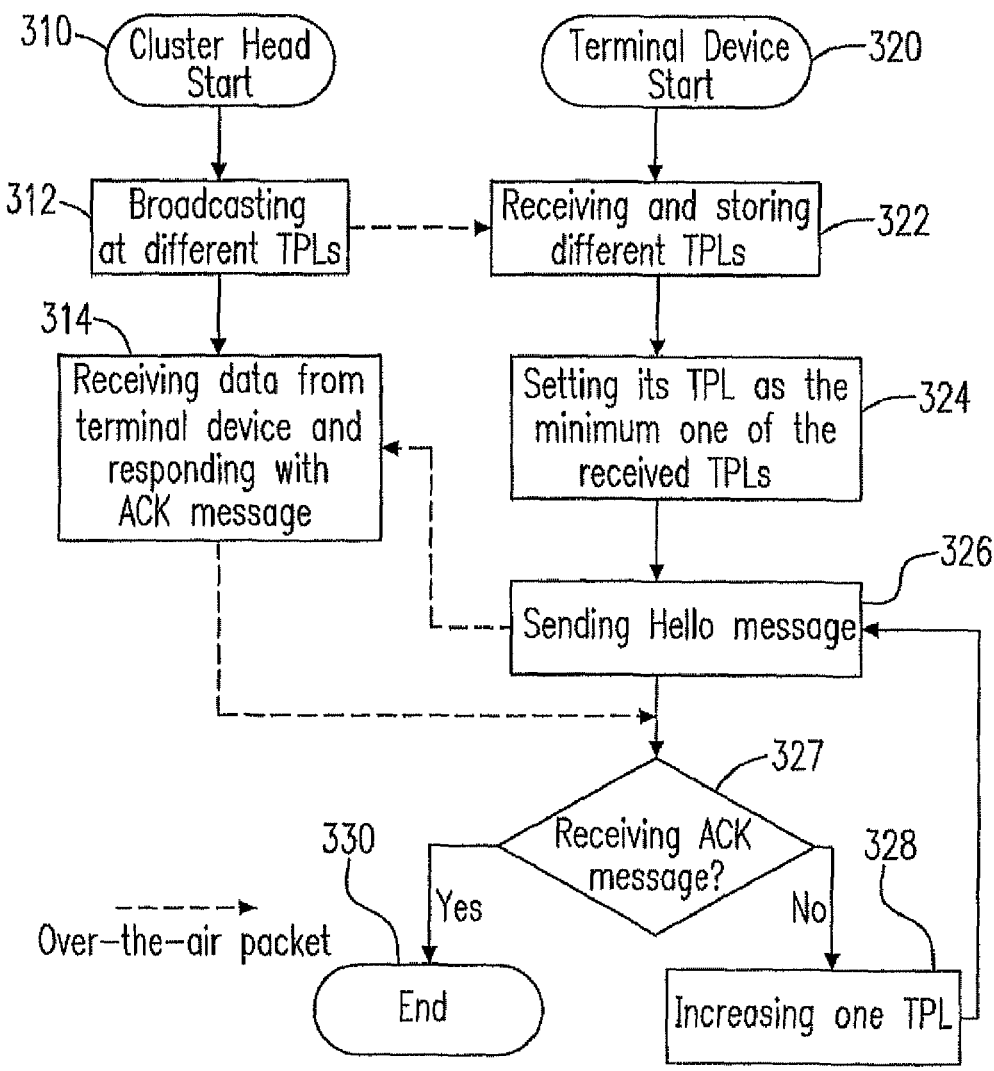
FIG. 3 is a schematic flow chart showing the first embodiment of the transmission power control method of the present invention.
Figure 4:
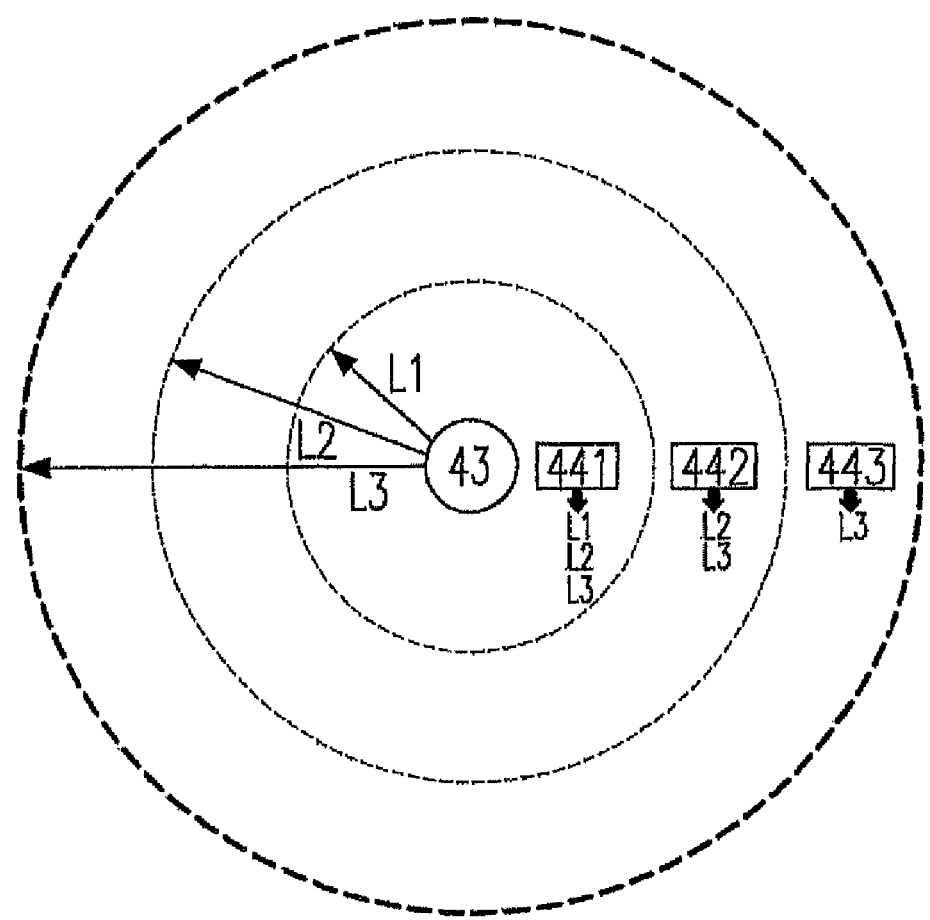
FIG. 4 is a schematic diagram showing the arrangement of the sensor network in the first embodiment of the present invention.

Please refer to the FIG. 3 and FIG. 4, wherein the FIG. 3 is a schematic flow chart showing the first embodiment of the transmission power control method of the present invention and the FIG. 4 is a schematic diagram showing the arrangement of the sensor network in the first embodiment.

As shown in FIG. 4, a cluster head 43 is the cluster head of the terminal devices 441, 442 and 443. The cluster head 43 is configured with three transmission power levels (TPLs), which are L1, L2, L3 ranked from low to high.

According the procedures shown in FIG. 3, at first, the cluster head 43 broadcasts a plurality of information packages at different transmitting power levels (TPL) (step 312), each of the information packages has a TPL message representing a respective TPL the cluster head 43 broadcast said information package thereby.

After that, each of the terminal devices 441, 442, 443 tries to receive the information packages broadcasted by the cluster head 43 and stores the TPL messages in a memory thereof (step 322). Since each of terminal devices is arranged with various distances and sheltery conditions from the cluster head 43, the ability for receiving the information packages broadcasted by the cluster head 43 is usually different from each other. As an example shown in FIG. 4, the terminal devices 441, 442, 443 are arranged from close to far to the cluster head 43.

A general information transmitting condition is taken as an example: while the cluster head 43 broadcasts a first information package at a lower TPL, i.e. L1, the information package only can be received by the closest terminal device 441, wherein the first information package has a message representing for the TPL L1. While the cluster head 43 broadcasts a second information package at a higher TPL L2, the second information package can be received by the terminal devices 441 and 442, but the farthest terminal device 443 (from the cluster head 43) still cannot receive the second information package, wherein the second information package has a message representing for the TPL L2. While the cluster head 43 broadcasts a third information package at the highest TPL L3, the third information package can be received by all the terminal devices 441, 442, 443, wherein the third information package has a message representing for the TPL L3. Each of the terminal devices 441, 442, 443 stores the messages representing for the TPL (TPL message) in the information package received thereby. Therefore, the terminal device 441 receives the three information packages having messages representing for the TPLs L1, L2, L3 respectively, and stores the messages representing for the TPLs L1, L2, L3 in the memory therein; and similarly the terminal device 442 stores the messages representing for the TPLs L2, L3 in the memory therein and the terminal device 443 stores the message representing for the TPL L3.

After that, considering for energy-conservation, the transmitting power level (TPL) of each of the terminal devices is set as the minimum one of the TPLs represented by the TPL messages received and stored by said terminal device (step 324). For example, the TPL of the terminal device 441 is set at L1, the TPL of the terminal device 442 is set at L2, and the TPL of the terminal device 443 is set at L3.

In order to confirm the terminal device can be communicated with the cluster head 43 at the set TPL, each of the terminal devices broadcasts a Hello message at the set TPL (step 326), if the Hello message is received by the cluster head 43, a acknowledge (ACK) message is transmitted by the cluster head 43 to the terminal device as a response to the Hello message (step 314), and then whether the ACK message can be received by the terminal device is determined. If the terminal device receives the ACK message transmitted by the cluster head 43, the setting of the TPL of the terminal device is well done (step 330) and the terminal device can indeed communicate with the cluster head 43 at the set TPL. If the terminal device fails to receive the ACK message from the cluster head 43, the TPL of the terminal device is raised up with one level, and the terminal device transmits a Hello message again to the cluster head 43 and at a newly and higher TPL (step 328), and the rest confirming procedures are the same as above mentioned. The confirming procedures are repeated until the terminal device receives an ACK message from the cluster head 43.

After the TPL setting of the end device as above mentioned is finished, when the external environment changes, such as the movement of the people or the furniture, the path the terminal device transmitted environment detection messages to the cluster head 43 might be blocked and the communication therebetween might be interfered. Hence, the TPL of the terminal device needs to be adjusted dynamically so as to confirm the environment detection messages can be transmitted to the cluster head 43 successfully.

However, as for a wireless sensor network, such as a environment detection system, loss of a little packages transmitted from a terminal device could be tolerated, since most of the communication therein is a one-way communication transmitting the detection information from a terminal device to a cluster head, and most of the environment physical phenomenon (such as the temperature) change slowly, moreover, and there are usually multiple sensor nodes (i.e. terminal devices) are placed for a single detection region.

Figure 5:
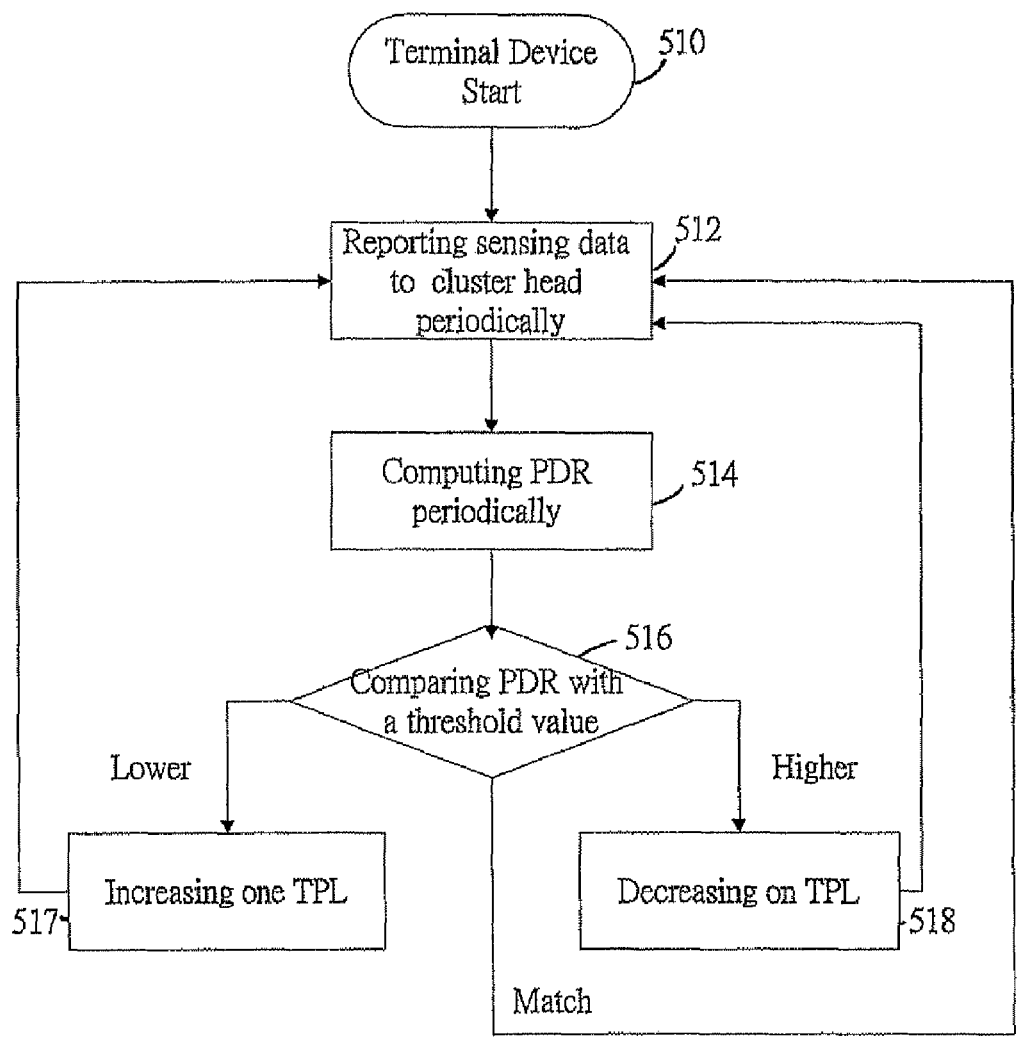
FIG. 5 is a schematic flow chart showing the second embodiment of the transmission power control method of the present invention.

Please refer to the FIG. 5, which is a schematic flow chart showing the second embodiment of the transmission power control method of the present invention. As shown in FIG. 5, a terminal device dynamically adjusts the transmitting power thereof in the operational phase. At first, a terminal device transmits the sensing data to the cluster head periodically (step 512) at the TPL set in the setup phase as mentioned above.

In order to show the actually transmitting condition for the sensing data packets, thinking of the change of the communication environment (such as a newly block appears in the communication path), a packet delivery ratio (PDR) of each of the terminal devices is computed at a specific time period (e.g. every hour) or a specific situation (e.g. every 1000 data packets are transmitted by the terminal device) (step 514), wherein the PDR is a ratio of an amount of packets successfully transmitted to the information receiving node by the terminal device to an amount of packets transmitted by the terminal device in a predetermined period, wherein the information receiving node could be a cluster head, and the PDR could be determined according to an accumulation of acknowledge (ACK) messages received by the terminal device, wherein the ACK messages are transmitted from the information receiving node.

Thereafter, the PDR is compared with a predetermined threshold value (step 516), such as 70% or 80%, and the TPL for the terminal device is raised up one level (step 517) if the PDR is lower than the predetermined threshold value. On the other hand, and the TPL for the terminal device is lowered down one level (step 518) if the PDR is higher than the predetermined threshold value.

Furthermore, the PDR could be compared with two predetermined threshold value, such as a lower threshold value as a first predetermined threshold value and a higher threshold value as a second predetermined threshold value, namely, the PDR of the terminal device is sought to be kept in the range between the first predetermined threshold value and the second predetermined threshold value, so as to keep the communication quality and save the power of the terminal device. The TPL for the terminal device is raised up one level (step 517) if the PDR is lower than the first predetermined threshold value, and the TPL for the terminal device is lowered down one level (step 518) if the PDR is higher than the second predetermined threshold value.

As for the dynamically adjustment for the TPL of the terminal device, the loss of little packets of periodical sensing data is usually tolerated and acceptable on the application for a wireless sensor network, hence the PDR could be set as a lower one to save the power of the terminal node in the present invention.

However, when a non-periodical accident happens, since the non-periodical accident might be an important environment change or a serious calamity, the sensing data must not be lost so that the accident can be conducted and settled immediately. Thus, the specific non-periodical message should be truly transmitted to the cluster head or the control center, and be dealt with properly therein, and an alarm message might be sent thereby.

Figure 6:
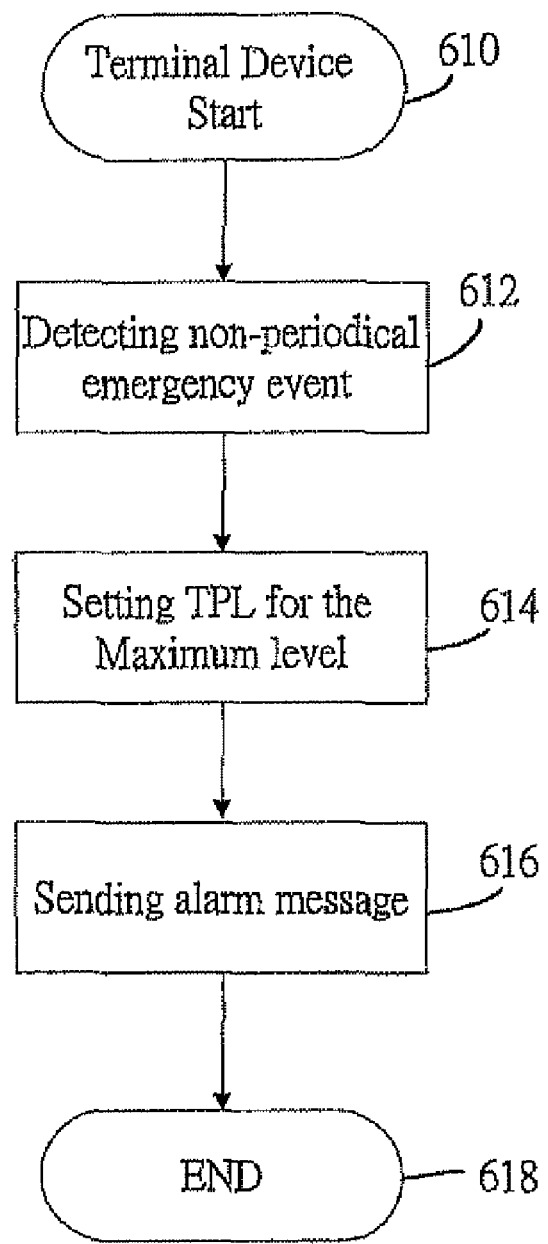
FIG. 6 is a schematic flow chart showing the third embodiment of the transmission power control method of the present invention.

Please refer to the FIG. 6, which is a schematic flow chart showing the third embodiment of the transmission power control method of the present invention. As shown in FIG. 6, when a specific non-periodical accident is detected by a terminal device (step 612), such as a fire accident detected by a smoke sensor, the TPL for the terminal device is raised up to the predetermined maximum level thereof (step 614), and an alarm message is announced at the maximum TPL (step 616), so as to prevent the data packet from being lost.

Figure 7:
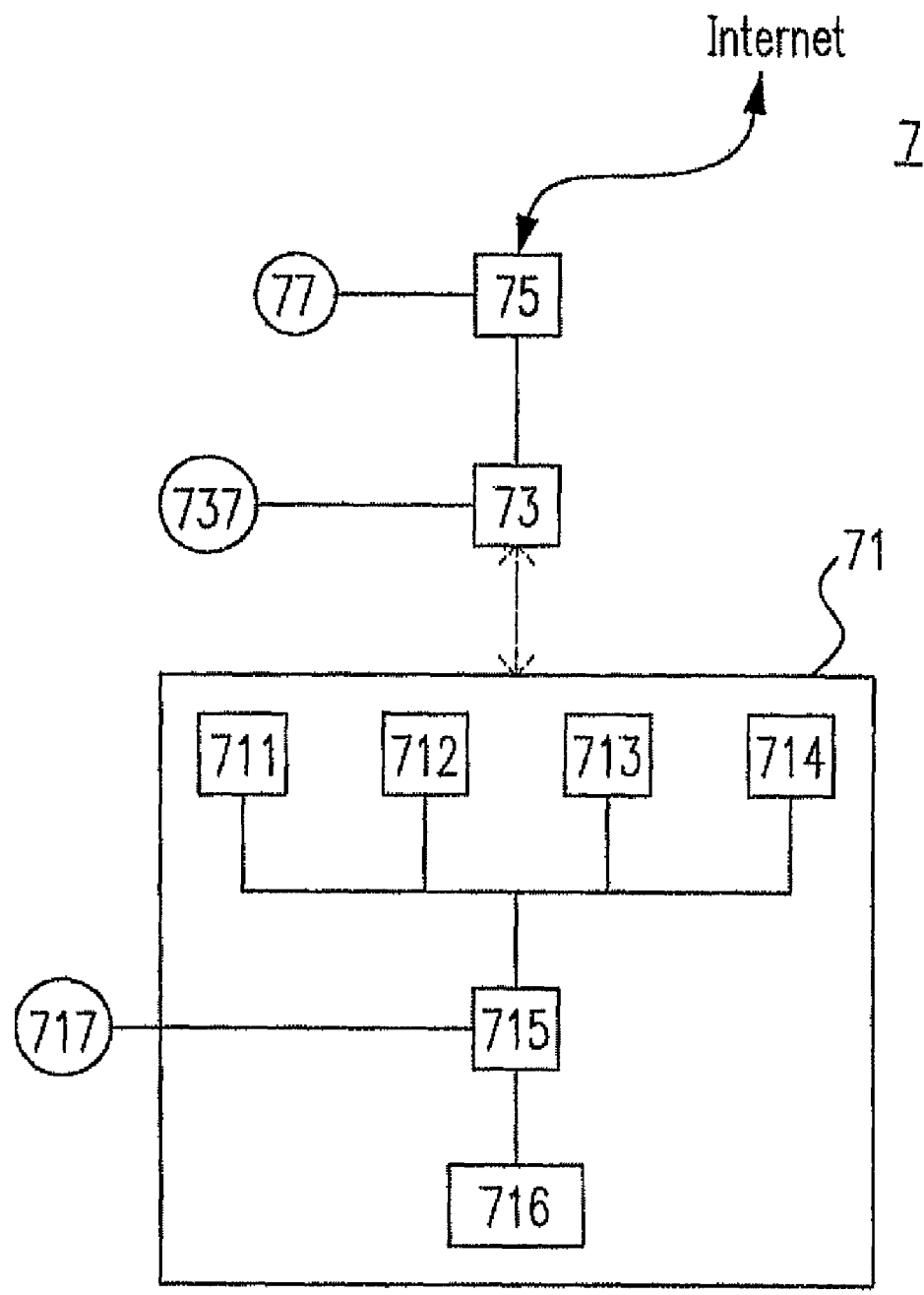
FIG. 7 is a schematic diagram showing the structure of transmission power control system of the fourth embodiment of the present invention.

Please refer to the FIG. 7, which is a schematic diagram showing the structure of transmission power control system of the fourth embodiment of the present invention. As shown in the FIG. 7, a sensor network transmitting power control system 7 includes a terminal device 71, a cluster head 73, a control center 75, and an alarm device 77. The terminal device 71 is configured for detecting the environment condition and reporting a detecting message, the terminal device 71 includes a detecting unit 711, an information receiving unit 712, an information transmitting unit 713, a storing unit 714, a processing unit 715 and a power source 716. The cluster head 73 is configured for receiving the detecting message and broadcasting a plurality of TPL messages in a setup phase, each of the TPL messages represents a respective TPL and is broadcasted at the respective TPL thereof, wherein the respective TPLs are different from one another. The terminal device 71 receives the plurality of TPL messages and the TPL of the terminal device is set at a minimum one of the TPLs represented by the received TPL messages. The detecting message is usually an environmental status message.

The control center 75 is connected with the cluster head 73 and is configured for receiving, storing, displaying and processing the detecting message transmitted from the cluster head 73, and controlling the cluster head 73 to broadcast the TPL messages in the setup phase. The alarm device 77 is connected with at least one of the control center 75, the cluster head 73 and the terminal device 71 and is configured for triggering an alarm.

In the terminal device 71, the detecting unit 711 is configured for detecting an environmental status; the information receiving unit 712 is configured for receiving the TPL messages broadcasted by the cluster head 73 and an acknowledge (ACK) message transmitted by the cluster head 73; the storing unit 714 is electrically connected with the information receiving unit 712 and is configured for storing the received TPL messages; the processing unit 715 is electrically connected with the detecting unit 711, the information receiving unit 712 and the storing unit 714 and is configured for determining the minimum one of the TPLs represented by the received TPL messages; the information transmitting unit 713 is electrically connected with the detecting unit 711 and the processing unit 715 and is provided with a dynamic power regulator, the information transmitting unit 713 is configured for transmitting a message at various TPLs, wherein the message includes a Hello message, an environment status message, and/or an alarm message; and the power source 716 is configured for providing the power for the terminal device 71, the power source is usually adopted as a battery.

The processing unit 715 is configured for calculating a successful message transmission ratio (SMTR) of a transmission from the information transmitting unit 713 to the cluster head 73, and comparing the SMTR with a first threshold value and a second threshold value, and adjusting the transmitting power of the information transmitting unit 713 accordingly. As an example, the SMTR could be a packet delivery ratio (PDR), which is a ratio of an amount of packets successfully transmitted by the terminal device 71 toward the cluster head 73 to an amount of packets transmitted by the terminal device 71 in a specific period. The TPL for the terminal device 71 is raised up one level if the PDR is lower than the first threshold value and is lowered down one level if the PDR is higher than the second threshold value.

Furthermore, when the detecting unit 711 detects a non-periodical emergency event, the TPL of the information transmitting unit 713 is adjusted to a predetermined maximum value and an emergency message is sent thereby, so that the emergency message can be infallibly transmitted. The emergency message is received by the cluster head 73 and transmitted to the control center 75, and then an alarm is sent by the alarm device 77 and, moreover, the emergency message could be transmitted to a mobile phone or a terminal system of a relevant people.

The terminal device 71 and/or the cluster head 73 can be configured with the independent alarm unit 717 and 737, when a non-periodical emergency event is detected by the detecting unit 711 and determined and confirmed by the processing unit 715, the terminal device 71 and/or the cluster head 73 can send an alarm independently while transmitting the emergency message, so as to alarm in advance.

Each of the terminal device 71, the cluster head 73 and the control center 75 is provided with a unique identification code respectively, and the control center 75 further includes a rule-based data base configured for storing the received detecting messages and a reaction corresponding to the detecting message based on a regulation rule, so that the control center 75 could compare the received detecting data with a rule and react thereupon.

The communication between the terminal device 71 and the cluster head 73 can be performed with a communication protocol being one selected from a group consisting of a ZigBee, a Z-Wave, a WiBree, a Bluetooth, an Insteon, a WiFi, a UWB and etc., and a combination thereof. The communication between the cluster head 73 and the control center 75 can be performed with a communication protocol being one selected from a group consisting of a ZigBee, a Z-Wave, a WiBree, a Bluetooth, an Insteon, a WiFi and a UWB, a power line communication (PLC), an Ethernet, a CAN bus and etc., and a combination thereof.

Summary, the transmission power control method and system in the present invention are provided with the functions of saving the power of the terminal device via adjusting the transmission power thereof, and prolongs the lifetime of the terminal device in the wireless sensor networks upon the original functions of the system are achieved. Besides, via the method of broadcasting the TPL messages by the cluster head, the setting of transmission power of the terminal devices can be approached to an optimum status fast, without localizing each of the terminal devices and/or lots of the complicated negotiations between the terminal devices and the cluster head. Hence the present invention has benefits in time and communication capacity, and further saves the power consumption of the terminal devices during the setup phase.

Consequently, the transmission power control method and system disclosed in the present invention are provided with the benefits of power saving, and are fast, easily and flexible to set, which are suitable for various kinds of wireless sensor networks and environmental detecting system. The benefits in saving the power of the terminal devices, prolonging the use time of the terminal devices, and reducing the communication load are obvious and expectable. Accordingly, the present invention can effectively solve the problems and drawbacks in the prior arts, and thus fits the demand of the industry and is industrially valuable.

While the invention has been described in terms of what is presently considered to be the most practical embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of controlling a transmitting power for a terminal device, comprising the steps of:
    (A) broadcasting from an information receiving node a plurality of transmitting power level (TPL) messages, each of which represents a respective TPL and the respective TPLs are different from one another, wherein each of the plurality of TPL messages is broadcasted at the respective TPL thereof; and
    (B) setting a TPL for the terminal device at a minimum one of the TPLs represented by the TPL messages received by the terminal device.

2. The method according to claim 1, wherein the step (B) further comprises a step of:
    (B1) storing the received TPL messages in the terminal device.

3. The method according to claim 1, further comprising the steps of:
    (C) determining whether the terminal device is communicating with an external information receiving node, and raising the TPL for the terminal device up one level if the terminal device is incapable of communicating with the information receiving node;
    (D) detecting whether a specific incident is happening; and
    (E) increasing the TPL for the terminal device to a predetermined maximum level thereof and announcing an alarm message if the specific incident is detected by the terminal device.

4. The method according to claim 3, wherein the information receiving node is a cluster head and the step (C) further comprises the steps of:
    (C1) transmitting a Hello message at the TPL for the terminal device;
    (C2) raising the TPL for the terminal device up one level if the terminal device fails to receive an acknowledge (ACK) message transmitted from the cluster head; and
    (C3) repeating the step (C1) and step (C2) until the terminal device receives the ACK message.

5. The method according to claim 3, wherein the step (D) further comprises the steps of:
    (D1) transmitting a detecting message by the terminal device;
    (D2) receiving the detecting message by the cluster head and transmitting the detecting message via the cluster head to a control center;
    (D3) comparing the detecting message with a data in the control center;
    (D4) announcing an alarm if the detecting message matches with a feature of the specific incident; and
    (D5) storing the detecting message.

6. The method according to claim 3 further comprising the steps of:
    (F) determining a packet delivery ratio (PDR) of the terminal device during a predetermined period;
    (G) comparing the PDR with a first threshold value and raising the TPL for the terminal device up one level if the PDR is lower than the first threshold value; and
    (H) comparing the PDR with a second threshold value and lowering the TPL for the terminal device down one level if the PDR is higher than the second threshold value.

7. The method according to claim 6, wherein the PDR is a ratio of an amount of packets successfully transmitted to the information receiving node by the terminal device to an amount of packets transmitted by the terminal device in a predetermined period, the information receiving node is a cluster head, and the PAR is determined according to an accumulation of acknowledge (ACK) messages received by the terminal device, and the ACK messages are transmitted by the cluster head.

8. The method according to claim 1, wherein the terminal device is one selected from a group consisting of a flame detecting device, a smoke detecting device, a temperature detecting device and a combination thereof.

9. A system for controlling a transmitting power, comprising:
    a cluster head receiving a detecting message and broadcasting a plurality of transmitting power level (TPL) messages, each of which represents a respective TPL and is broadcasted at the respective TPL thereof, wherein the respective TPLs are different from one another; and a terminal device receiving the plurality of TPL messages and transmitting the detecting message by setting the TPL for the terminal device at a minimum one of the TPLs represented by the received TPL messages.

10. The system according to claim 9, further comprising:

a control center connected with the cluster head, storing and processing the detecting message transmitted from the cluster head and controlling the cluster head for broadcasting the plurality of TPL messages; and an alarm device connected with the control center and the terminal device and announcing an alarm, wherein the terminal device comprises:

a detecting unit detecting an environmental status;

an information receiving unit receiving the TPL messages broadcasted by the cluster head and an acknowledge (ACK) message transmitted by the cluster head;

a storing unit electrically connected with the information receiving unit and storing the received TPL messages;

a processing unit electrically connected with the information receiving unit and determining the minimum one of the TPLs represented by the received TPL messages;

an information transmitting unit electrically connected with the detecting unit and the processing unit, having a dynamic transmitting power regulator and can transmit a first message at a specific TPL; and a power source providing power for the terminal device, wherein the processing unit calculates a successful message transmission ratio (SMTR) of a transmission from the information transmitting unit to the cluster head, compares the SMTR with a first threshold value and a second threshold value and adjusts the transmitting power of the information transmitting unit accordingly, and the detecting message is an environmental status message.

11. The system according to claim 10, wherein the power source is a battery, and the first message is one selected from a group consisting of a Hello message, the environmental status message and an alarm message and a combination thereof, the SMTR is a packet delivery ratio (PDR) being a ratio of an amount of packets successfully transmitted by the terminal device toward the cluster head to an amount of packets transmitted by the terminal device in a specific period, the TPL for the terminal device is raised up one level if the PDR is lower than the first threshold value and is lowered down one level if the PDR is higher than the second threshold value, and the alarm message is transmitted at a predetermined maximum TPL for the terminal device by the information transmitting unit.

12. The system according to claim 10, wherein a communication between the cluster head and the control center is performed with a communication protocol being one selected from a group consisting of a ZigBee, a Z-Wave, a WiBree, a Bluetooth, an Insteon, a WiFi and a UWB, a power line communication (PLC), an Ethernet and a CAN bus and a combination thereof, each of the terminal device, the cluster head and the control center is provided with a unique identification code, and the control center has a data base storing the environmental status message and a reaction corresponding to the environmental status message based on a regulation rule.

13. The system according to claim 9, wherein a communication between the terminal device and the cluster head is performed with a communication protocol being one selected from a group consisting of a ZigBee, a Z-Wave, a WiBree, a Bluetooth, an Insteon, a WiFi, a UWB and a combination thereof.

14. A method of adjusting a transmitting power for a detecting device, comprising the steps of:

(A) determining a successful message transmission ratio (SMTR) of the detecting device by broadcast of messages via an information receiving node, wherein each of the plurality of messages represents a respective TPL and a value of the respective TPL and is broadcasted at the respective TPL thereof and setting the TPL for the detecting device at a minimum one of the TPLs represented by the TPL messages received by the detecting device; and (B) comparing the SMTR with a threshold value, and adjusting a transmitting power level (TEL) of the detecting device according to a comparing result.

15. The method according to claim 14, wherein the step (B) further comprising the steps of:

(B1) comparing the SMTR with a first threshold value, and raising the TPL of the detecting device up one level if the SMTR is lower than the first threshold value; and (B2) comparing the SMTR with a second threshold value, and lowering the TPL of the detecting device up one level if the SMTR is higher than the second threshold value.

16. The method according to claim 14 further comprising the steps of:

(C) increasing the TPL of the detecting device to a predetermined maximum level of the detecting device and announcing an alarm message if the detecting device detects a specific incident.

17. The method according to claim 14, wherein the detecting device is one selected from a group consisting of a flame detecting device, a smoke detecting device and a temperature detecting device and a combination thereof, and the specific incident is a fire accident.

18. The method according to claim 14, wherein the detecting device has an information receiving point, the SMTR is a ratio of an amount of messages successfully transmitted by the detecting device toward the information receiving point in one of a specific period and a specific message amount to an amount of messages transmitted by the detecting device.

19. The method according to claim 14, wherein the step (A) further comprises the steps of:

(A1) determining whether the detecting device is communicating with the information receiving node; and (A2) raising the TPL of the detecting device up one level if the detecting device fails to communicate with the information receiving node.

20. The method according to claim 19, wherein the information receiving node is a cluster head, and the step (A1) further comprises the steps of:

(A11) transmitting a Hello message by the detecting device; and (A12) receiving an acknowledge (ACK) message responding to the Hello message from the cluster head.

* * * * *